United States Patent [19]

Genequand et al.

[11] Patent Number: 4,613,105
[45] Date of Patent: Sep. 23, 1986

[54] DEVICE FOR ALIGNING OPTICAL COMPONENTS

[75] Inventors: Pierre Genequand, Geneva; Philippe Schwab, Yverdon, both of Switzerland

[73] Assignee: Fondation Suisse pour la Recherche en Microtechnique, Neuchatel, Switzerland

[21] Appl. No.: 694,859

[22] Filed: Jan. 25, 1985

[30] Foreign Application Priority Data

Feb. 2, 1984 [FR] France ............................. 84 01735

[51] Int. Cl.$^4$ ............................................. F16M 11/04
[52] U.S. Cl. ........................................ 248/178; 248/1
[58] Field of Search ....... 248/178, 177, 176, DIG. 13, 248/466, 469, 475.1, 476; 350/531

[56] References Cited

U.S. PATENT DOCUMENTS

| 3,525,140 | 8/1970 | Cachon et al. | 248/DIG. 13 |
| 3,849,857 | 11/1974 | Murray | 248/DIG. 13 |
| 4,226,392 | 10/1980 | Healy | 248/178 |
| 4,295,625 | 10/1981 | Degger et al. | 248/466 |
| 4,492,356 | 1/1985 | Taniguchi et al. | 248/178 X |

Primary Examiner—Ramon O. Ramirez
Attorney, Agent, or Firm—Frost & Jacobs

[57] ABSTRACT

The present invention concerns a device for aligning two optical components.

This device comprises a frame composed of a first base plate having two branches which are essentially parallel to each other and a second base plate which also has two branches essentially parallel to each other. One branch carries a first mobile support which is fixed at the end of two flexible strips. The other branch carries a second mobile support being fixed at the ends of two other flexible strips. The two supports carry the two members to be assembled and may be moved relatively to each other in a plane by means of micrometric screws.

This device permits to align two members with respect to each other and to fix them in their position.

10 Claims, 6 Drawing Figures

DEVICE FOR ALIGNING OPTICAL COMPONENTS

FIELD OF INVENTION

The present invention concerns a device for aligning a first member, for example an optical component, with respect to a second member such as, for example, another optical component, comprising a frame carrying a first support on which said first member is mounted and a second support on which said second member is mounted, as well as means for moving said two supports relatively to each other, said first support being connected to the frame by means of two elongated strips which are flexible in a direction perpendicular to their longitudinal axis and which are arranged parallel to each other, thereby permitting a translational movement of said first support in a first direction, the second support being connected to the frame by means of two elongated strips which are flexible in a direction perpendicular to their longitudinal axis and arranged parallel to each other as to permit a translational movement of said second support in a second direction perpendicular to said first direction, at least one of the two supports comprising means for relative adjustment of two plane contact surfaces of said two members.

Several systems for precisely aligning two optical components are already known, in particular two optical fibers, a light source and an optical fiber, or a detector and an optical fiber, and so forth. However, the industrial assembly of these components often requires that aligning includes a further step for permanent fixing of the relative position in order to maintain the alignment.

The present invention proposes a device as mentioned above which permits to bring into contact two members to be assembled in a permanent manner and to position them precisely and along two perpendicular axis forming the contact plane.

SUMMARY OF INVENTION

To obtain the above objective, a device according to the invention is characterized by at least one of said two supports being composed of two elements, one of which carrying the corresponding member, the other one being fixed to the corresponding ends of the flexible elongated strips which connect said support to the frame, these two elements being connected to each other by means of at least three spring strips which are arranged essentially in the contact plane of the two members to be aligned and along three non-converging directions, thereby forming an assembly which is rigid in said plane but flexible in a direction perpendicular to said plane and which is equivalent to an accomodation membrane permitting contacting of the two closely to each other prepositioned members and the subsequent desired relative positioning by displacement along the contact plane, the contact being maintained during the entire process until the two members are fixed permanently with respect to each other.

According to a preferred embodiment of the invention, one of the elements is located within a hole of the other element.

The inner element and the other element have preferably an annular shape and are concentric to each other.

In order to provide a compact assembly, whereby the space between the two elements be reduced to a minimum, however maintaining a sufficient amount of flexibility, the spring strips are advantageously disposed in an essentially tangential relationship to the annular element, each spring having one end connected to one of the elements and the other end connected to the other element. This arrangement permits to house the relatively elongated springs within an annular space of small dimensions.

Preferably four spring strips are arranged around the inner element in regular distance, forming the sides of a square which approximatively surrounds said element. Said strips are advantageously raised above the surface of the two elements to which they are connected, thus being situated in the contact plane of the members to be aligned, however without said two elements touching each other.

Said means for relative adjustment of the contact surfaces of the two members comprise preferably at least one pressure spring for urging the two contact surfaces against each other and for maintaining them in this relative position.

The fixation means for one of the members comprises advantageously jaws which are urged against each other by spring means.

The other member is preferably mounted in a detachable but rigid fashion on the second support. For this purpose, the second support comprises advantageously rapid fixation means such as, for example, a sliding drawer.

The present invention will be better understood with reference to the description of an embodiment of the invention and the accompanying drawing, whereof:

FIG. 1 represents a perspective view in a device according to the invention,

FIG. 2 represents a top view which illustrates a part of the frame and the first support carrying said first member to be assembled, FIG. 3 represents a top view of said first support carrying the corresponding member, FIG. 4 represents a section view along the line A—A of the device illustrated in FIG. 3, FIG. 5 represents a top view of the second support carrying the other member to be assembled, and FIG. 6 represents a section view along the line B—B of the second support illustrated in FIG. 5.

DESCRIPTION OF A PREFERRED EMBODIMENT

Figure 1:
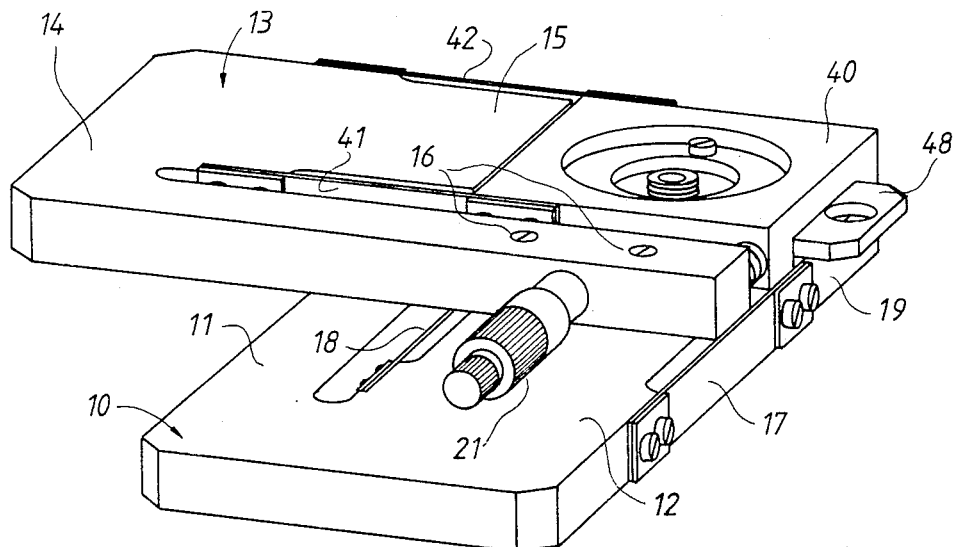

With reference to the figures and in particular to FIG. 1, the described device comprises a frame composed of a first base plate 10 comprising two branches 11 and 12 essentially parallel to each other and a second base plate 13 comprising two branches 14 and 15 also parallel to each other. The two base plates 10 and 13 are connected to each other by means of screws 16.

Figure 2:
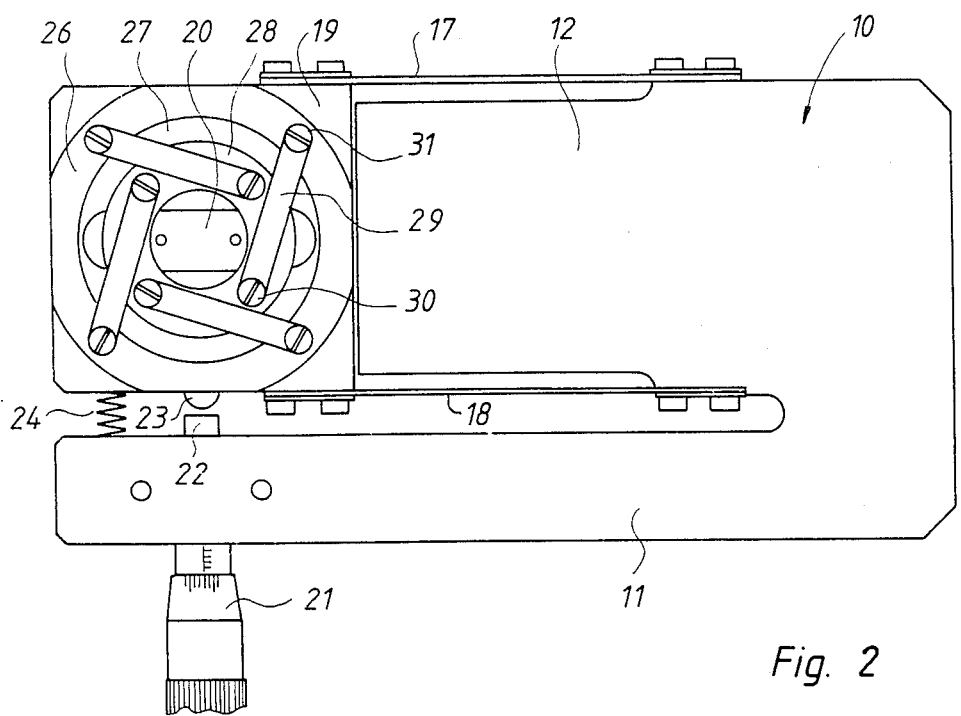

The branch 12 comprises, as shown particularly in FIG. 2, two parallel strips 17 and 18 which are flexible in a direction perpendicular to their longitudinal axis. As the first support 19, which carries the first member 20 to be assembled, is fastened at the ends of said strips 17 and 18, the two strips 17 and 18 form a module with merely elastic deformations for the support 19 and the corresponding member 20, which module permits a modest movement of the member 20 along an axis perpendicular to said strips 17 and 18. This movement may be originated by means of a micrometric screw 21, the end of the piston 22 of which abuts on to a button 23 which is part of the support 19. A spring 24 assures the permanent abutment of the piston 22 against the button 23.

The support 19 is composed of two elements, one of which 26 being herein called the outer element comprises a central hole 27 within which the second element 28 is at least partially contained, this second element being called hereinafter the inner element. Said two elements are preferably arranged in a concentric fashion. The two elements 26 and 28 are fastened to each other by means of four strips 29, one end of which being fixed by means of a screw 30 or by other appropriate means to the surface of the element 28, the other end being fixed by a screw 31 or any other appropriate means against an annular cushion being arranged on the element 26 along the edge of the central hole 27. The strips 29 are preferably disposed in a square manner surrounding said first member 20 which is contained within the central hole of the element 28. These strips are advantageously arranged above the surface of the two elements to which they are fastened, for example by means of interposed washers. The screws 30 and 31 being completely fastened, thus blocking the corresponding ends of the strips 29, such that the member 20 is fixed to the element 28 and cannot rotate around an axis perpendicular to the plane of the contact surface of the other member. However member 20 may swing around axis within this plane, the mechanism being equivalent to a knee joint which permits movements of small amplitude without any tolerance in the contact plane.

Figure 3:
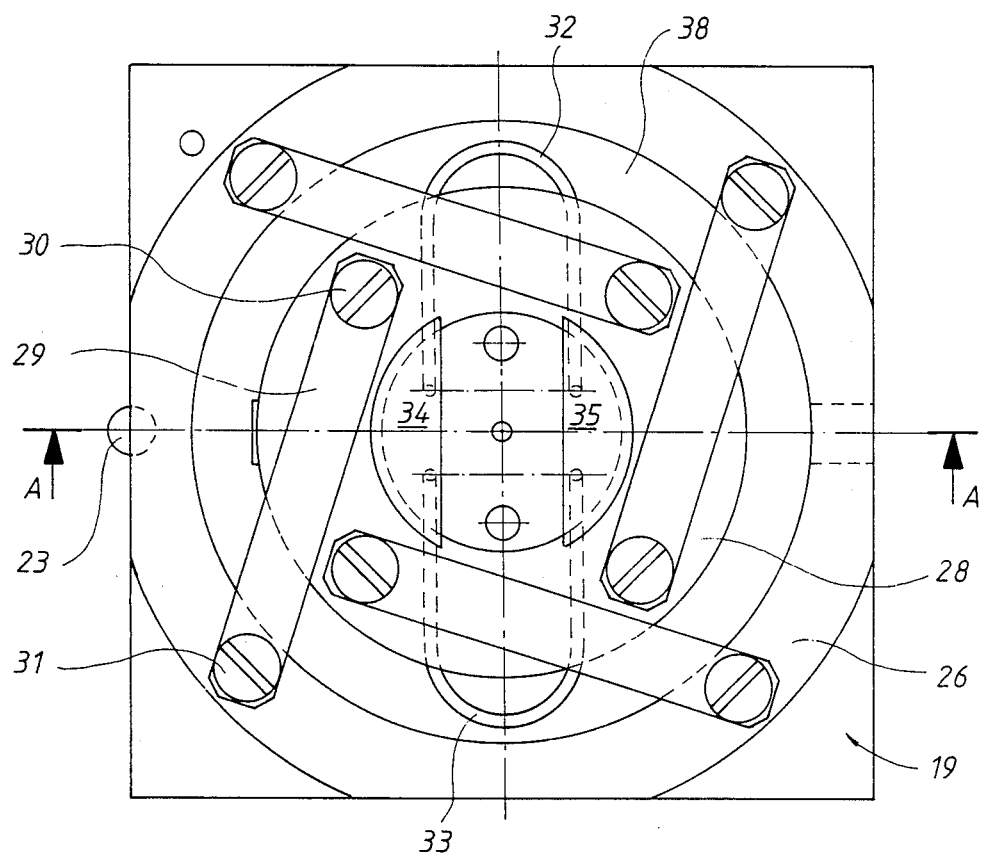
Figure 4:
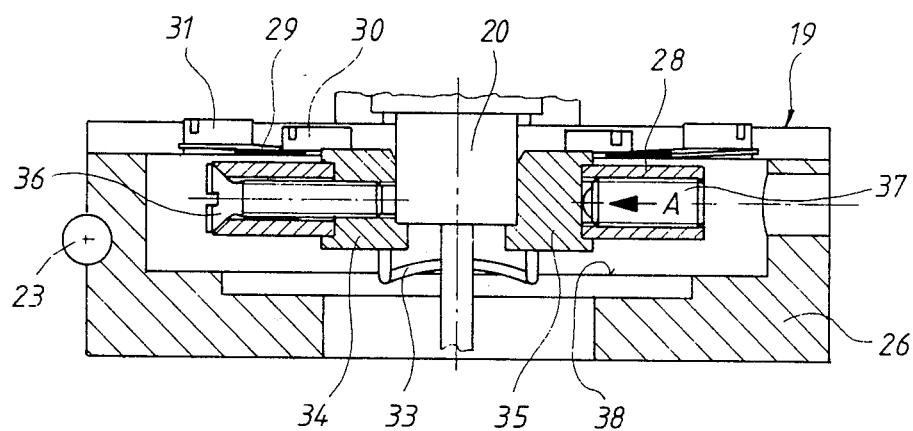

With reference to FIGS. 3 and 4, the first member 20, being constituted for example by a light source such as a light emitting diode being located within its housing, is retained by two holding jaws 34 and 35 of a vise, these jaws being mounted facing each other on the inner element of the first support 19. The holding jaw 34 is rigidly fixed to the element 28 by a fixation screw 36. The jaw 35, to the contrary, is radially movable. A ball screw 37, or any other similar member, presses the jaw 35 in the direction of arrow A by pushing it against the facing surface of the member 20.

Two bowed pressure springs 32 and 33 comprise two branches each, the ends of which are fastened respectively to the two jaws 34 and 35. The curved portions of the two springs 32 and 33 abut on the edge 38 of an inner annular cushion arranged along the inner face of the element 26.

The springs 32 and 33 serve to urge against each other the two contact surfaces of the two members to be assembled and to maintain the jaws 34 and 35 in their position during the absence of the member 20.

Figure 5:
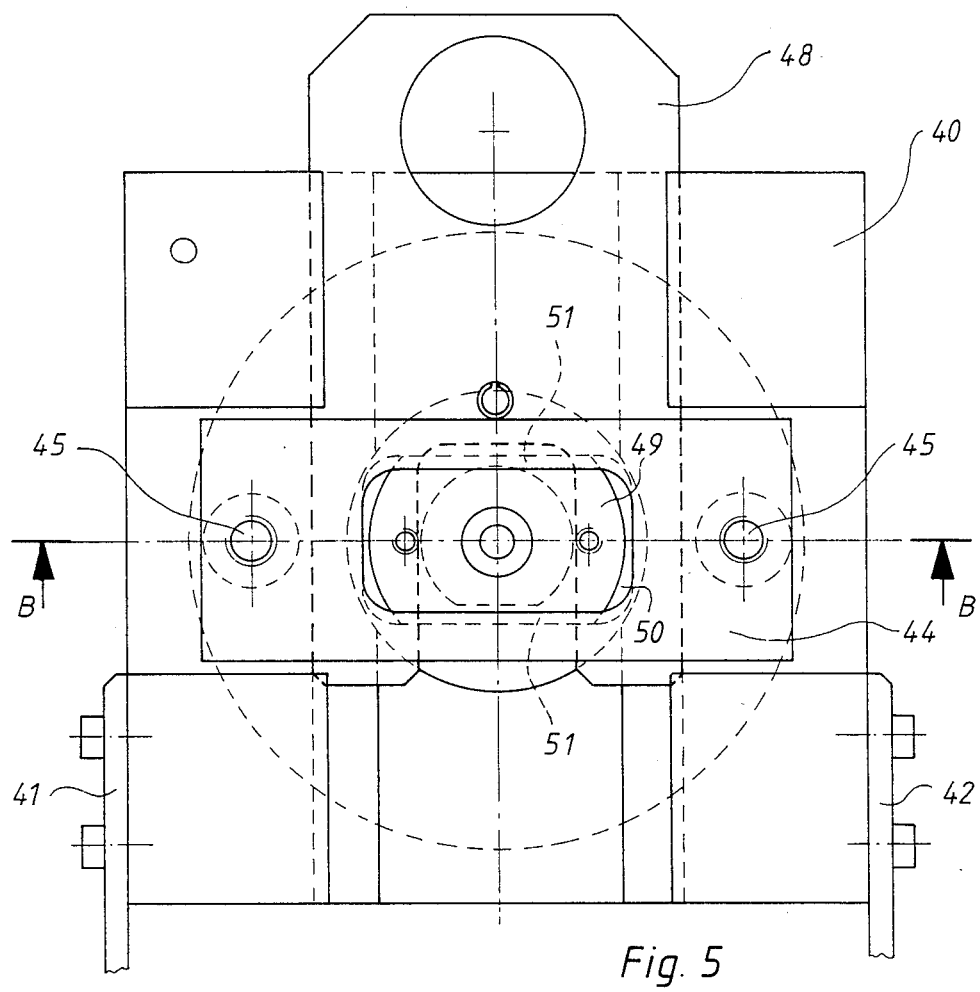
Figure 6:
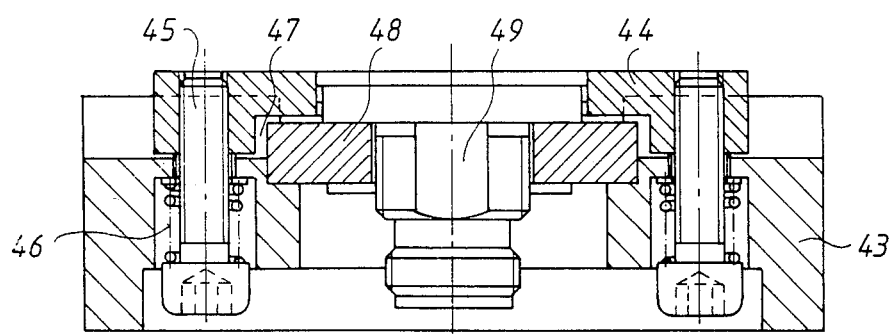

With reference to FIGS. 5 and 6, the second support 40 is fixed to the ends of elongated strips 41 and 42 which are flexible in a direction perpendicular to their longitudinal axis, strips 41 and 42 being connected at their other ends to a branch 15 of the base plate 13. Support 40 is composed of a base block 43 and a yoke 44 which are assembled by means of a screw 45 and compression springs 46 of helicoidal form being disposed around the screws 45. These two elements define a guiding corridor 47 comprising a drawer 48 which serves for the blockage of the second member 49 which may be, for example, the base member of a connector to be aligned with a light source which constitutes the first member as previously defined. The yoke 44 comprises a central hole 50 and two lateral cushions 51 in order to assure the fixation of the connector base member 49. These different means permit a rapid fixation of the second member 49 which is blocked in position with respect to the corresponding support.

To bring the two members to be assembled into their optimum relative positions, the operator has to use the micrometric screws or any other appropriate mechanism, which permits to obtain the same effect in order to assure the movement of the members in their contact plane. The alignment of the two contact surfaces is automatically effected by the strips 29 and the springs 32 and 33 as described before which permits a knee joint like movement of small dimensions.

In practice the source and the connector base member are located in their respective housings and preassembled by means of screws, which are set up but not fastened. The prepositioning of the members is thereby assured and it provides a sufficient play to permit an optimisation of power transmission between the source and the base member.

With the drawer in its open position, the two prepositioned members are slid from behind the frame into a position in which the housing of the source abuts against the back of the jaw of the vise and the base member abuts against the lateral cushions 51 represented in FIG. 5. The drawer is closed subsequently. It comprises a curvature which lifts the yoke by means of the base member slides underneath the yoke and thereby applies a pressure against the base member which is thus blocked in position between the yoke and the drawer.

Subsequently the source may be supplied and the fiber may be connected such that the power which is transmitted from the source to that fiber may be detected. The positioning is subsequently optimised by relative movement of the two members, whereafter the assembling screws are fastened. The drawer may be withdrawn, which results in ejecting the two assembled members by means of the pressure exerted by the springs 46, 32 and 33.

The present invention is not limited to the embodiment as described above and may be modified in different ways evident to the man skilled in the art.

We claim:

1. A device for aligning a first member such as, for example, an optical component with respect to a second member such as, for example, another optical component, comprising a frame carrying a first support on which said first member is mounted and a second support on which said second member is mounted, as well as means for moving said two supports relatively to each other, said first support being connected to the frame by means of two elongated strips which are flexible in a direction perpendicular to their longitudinal axis and which are arranged parallel to each other, thereby permitting a translational movement of said first support in a first direction, the second support being connected to the frame by means of two elongated strips which are flexible in a direction perpendicular to their longitudinal axis and arranged parallel to each other as to permit a translational movement of said second support in a second direction perpendicular to said first direction, at least one of said two supports comprising means for relative adjustment of two plane contact surfaces of said two members, wherein at least one of said two supports is composed of two elements, one of which carrying the corresponding member and the other one being fixed to the corresponding ends of the flexible elongated strips which connect said support to the frame, these two elements being connected to each other by means of at least three spring strips which are arranged essentially in the contact plane of the two members to be aligned and along three non-coverging directions, thereby forming an assembly which is rigid in said plane but flexible in a direction perpendicular to said plane and which is equivalent to an accomodation membrane permitting contacting of the two closely to each other prepositioned members and the subsequent desired relative positioning by displacement along the contact plane, contact being maintained during the entire process until the two members are fixed permanently with respect to each other.

2. The device of claim 1, wherein one of said elements is located within a hole in the other element.

3. The device of claim 2, wherein the two elements have an annular shape and are disposed in concentric relationship to each other.

4. The device of claim 3, wherein the spring strips are disposed tangentially to the inner one of said annular elements, each of said strips having one end connected to one of said elements and the other end connected to the other element.

5. The device of claim 1, wherein the spring strips are raised above the surface of the two elements to which they are connected, thereby being located in the contact plane of the two members to be aligned, without said two elements touching each other.

6. The device of claim 3, wherein four spring strips are arranged in a square approximately surrounding the inner element.

7. The device of claim 1, wherein the means for relative adjustment of the contact surfaces of the two members comprises at least one pressure spring for urging the contact surfaces of the two members against each other and for maintaining them in this relative position.

8. The device of claim 7, wherein said pressure spring is constituted by two bowed springs, the round portion of which abuts on an annular edge of the outer element and the ends of which are fastened to two jaws of a vise integral with the inner element for fixing said first member.

9. The device of claim 1, wherein said second member is rigidly fixed on the second support.

10. The device of claim 9, wherein said second member is rigidly maintained in its position on the second support by a sliding drawer.

* * * * *